United States Patent
Yoshitake et al.

(10) Patent No.: US 12,146,776 B2
(45) Date of Patent: Nov. 19, 2024

(54) PROPAGATION TIME MEASUREMENT DEVICE

(71) Applicant: OMRON Corporation, Kyoto (JP)

(72) Inventors: Naoki Yoshitake, Kyoto (JP); Yui Ishida, Kyoto (JP); Takeshi Fujiwara, Kyoto (JP); Yoshitaka Tsurukame, Kyoto (JP); Masaki Yawata, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 354 days.

(21) Appl. No.: 17/769,888

(22) PCT Filed: Sep. 25, 2020

(86) PCT No.: PCT/JP2020/036323
§ 371 (c)(1),
(2) Date: Apr. 18, 2022

(87) PCT Pub. No.: WO2021/084985
PCT Pub. Date: May 6, 2021

(65) Prior Publication Data
US 2022/0291026 A1    Sep. 15, 2022

(30) Foreign Application Priority Data

Oct. 29, 2019    (JP) ................... 2019-196256

(51) Int. Cl.
    *G01F 1/667*      (2022.01)
(52) U.S. Cl.
    CPC .................. *G01F 1/667* (2013.01)

(58) Field of Classification Search
CPC ............ G01F 1/667; G01F 1/662; G01F 1/66; G01N 29/036; G01N 29/3436;
(Continued)

(56) References Cited

U.S. PATENT DOCUMENTS 6,546,810 B1    4/2003    Beaducel et al.
6,647,805 B2 *   11/2003    Kobayashi ............... G01F 1/74
                                                                 73/861.27
(Continued)

FOREIGN PATENT DOCUMENTS

JP    H08110376 A    4/1996
JP    2000046854 A    2/2000
(Continued)

OTHER PUBLICATIONS

Extended European Search Report issued in European Appln No. 20882140.5 mailed Oct. 13, 2023.
(Continued)

*Primary Examiner* — Suman K Nath
(74) *Attorney, Agent, or Firm* — ROSSI, KIMMS & McDOWELL LLP

(57) ABSTRACT

A device determines a propagation time of an acoustic signal through cross-correlation analysis between a transmission signal and a reception signal. The device generates the transmission signal to satisfy (1) a ratio of a height of a peak other than a maximum peak in an autocorrelation function of the transmission signal to a height of the maximum peak being 0.8 or less and (2) a duration of the transmission signal being at least five times a shortest period of the transmission signal or at least 20 times a half width at half maximum of the autocorrelation function of the transmission signal.

18 Claims, 15 Drawing Sheets

(58) Field of Classification Search
CPC ......... G01N 29/4409; G01N 2291/105; G01N 2291/106; G01N 2291/2634
See application file for complete search history.

(56) References Cited

U.S. PATENT DOCUMENTS

| | | |
|---|---|---|
| 6,658,944 B2 | 12/2003 | Melnikov et al. |
| 2002/0143479 A1 | 10/2002 | Fukuhara |
| 2008/0250870 A1 | 10/2008 | Rhodes |

FOREIGN PATENT DOCUMENTS

| | | |
|---|---|---|
| JP | 2000206133 A | 7/2000 |
| JP | 2000314742 A | 11/2000 |
| JP | 2002243514 A | 8/2002 |
| JP | 2008304281 A | 12/2008 |
| JP | 2009505054 A | 2/2009 |
| JP | 2013185891 A | 9/2013 |
| JP | 2017187310 A | 10/2017 |

OTHER PUBLICATIONS

International Search Report issued in Intl. Appln. No. PCT/JP2020/036323 mailed Dec. 22, 2020. English translation provided.
Written Opinion issued in Intl. Appln. No. PCT/JP2020/036323 mailed Dec. 22, 2020. English translation provided.
Office Action issued in Japanese Appln. No. 2019-196256 mailed Nov. 7, 2023. English machine translation provided.
Reconsideration Report by Examiner before Appeal issued in Japanese Appln. No. 2019-196256 on May 27, 2024. English machine translation provided.

* cited by examiner

PROPAGATION TIME MEASUREMENT DEVICE

TECHNICAL FIELD

The present invention relates to a technique for measuring the propagation time of an acoustic signal.

BACKGROUND

Known devices in practical use measure the propagation time of an acoustic signal propagating inside a pipe with a sensor externally mounted on the pipe. Such devices non-destructively measure the flow velocity and the flow rate of a fluid flowing in the pipe based on the propagation time. Such a device typically uses ultrasound as an acoustic signal, and is referred to as, for example, an ultrasonic flowmeter.

For example, Patent Literature 1 describes a device that uses a pair of upstream and downstream ultrasonic vibrators on a pipe to determine the flow rate of a fluid based on the difference in propagation time between ultrasound propagating in the flow direction of the fluid and ultrasound propagating in the direction opposite to the flow direction. The device in Patent Literature 1 calculates, as the propagation time difference, the cross-correlation between the signal received by the upstream ultrasonic vibrator and the signal received by the downstream ultrasonic vibrator. Patent Literature 2 describes use of the Hilbert transform to determine the correlation peak from the cross-correlation between an upstream reception signal and a downstream reception signal.

CITATION LIST

Patent Literature

Patent Literature 1: Japanese Unexamined Patent Application Publication No. 2008-304281
Patent Literature 2: Japanese Unexamined Patent Application Publication No. 2002-243514

SUMMARY

Technical Problem

A pulse signal or a burst signal is commonly used as a signal for measurement. However, these signals are susceptible to noise and limit the accuracy of cross-correlation analysis. Thus, known ultrasonic flowmeters cannot be used for highly accurate measurement such as measurement of low flow rates.

In response to the above issue, one or more aspects of the present invention are directed to a technique for measuring propagation time highly accurately with high robustness to noise.

Solution to Problem

A propagation time measurement device according to an aspect of the present disclosure includes a plurality of vibrators located at different positions relative to a pipe in which a fluid flows and including at least a first vibrator that converts a transmission signal being an electric signal to an acoustic signal and a second vibrator that receives the acoustic signal transmitted from the first vibrator and propagating through the fluid in the pipe and converts the acoustic signal to a reception signal being an electric signal, a transmission signal generator that generates the transmission signal for measurement, and a signal processor that determines a propagation time of the acoustic signal from the first vibrator to the second vibrator through cross-correlation analysis between the transmission signal and the reception signal. The transmission signal generator generates the transmission signal to satisfy (1) a ratio of a height of a peak other than a maximum peak in an autocorrelation function of the transmission signal to a height of the maximum peak being 0.8 or less and (2) a duration of the transmission signal being at least five times a shortest period of the transmission signal or at least 20 times a half width at half maximum of the autocorrelation function of the transmission signal.

The reception signal satisfying condition 1 causes a sufficiently large difference between the maximum peak and other peaks in the cross-correlation function between the transmission signal and the reception signal. Thus, the difference between the maximum peak and the other peaks (or easily identifiable and distinctive maximum peak) is retained for a reception signal with a waveform distorted to a certain degree by, for example, noise. The transmission signal with a duration satisfying condition 2 increases the amount of information to undergo cross-correlation analysis between the transmission signal and reception signal. This structure is expected to reduce errors in the cross-correlation function. In other words, the transmission signal satisfying conditions 1 and 2 causes a cross-correlation function to have fewer errors and have an easily identifiable and distinctive maximum peak. This allows accurate determination of the maximum peak position in the cross-correlation function, or more specifically, accurate determination of the propagation time of the acoustic signal.

The transmission signal generator may generate the transmission signal to further satisfy (3) the duration of the transmission signal being at least 10 times the shortest period of the transmission signal or at least 40 times the half width at half maximum of the autocorrelation function of the transmission signal. Condition 3 is stricter than condition 2. Thus, the transmission signal with a duration satisfying condition 3 further reduces errors in the cross-correlation function to further improve the measurement accuracy of the propagation time of the acoustic signal.

The transmission signal generator may generate the transmission signal to further satisfy (4) the duration of the transmission signal being shorter than a minimum propagation time estimated as the propagation time of the acoustic signal from the first vibrator to the second vibrator. With the maximum duration of the transmission signal set to satisfy condition 4, the transmission period of the transmission signal and the reception period of the reception signal can avoid overlapping each other. Thus, crosstalk causing any transmission signal mixed into the path of the reception signal does not affect signal analysis.

Various transmission signals can satisfy conditions 1 to 4 described above. For example, the transmission signal may include a frequency-modulated signal. The transmission signal may include a signal including a random pulse. The transmission signal may include a signal containing a plurality of signals having different frequencies combined together. The transmission signal may include a signal having a frequency changing at predetermined time segments.

The signal processor may use a plurality of reception signals resulting from a plurality of transmissions from the first vibrator and a plurality of receptions by the second vibrator to perform cross-correlation analysis. The use of multiple reception signals reduces noise, thus improving the accuracy of cross-correlation analysis.

The signal processor may generate a noise-reduced reception signal using the plurality of reception signals and perform cross-correlation analysis between the transmission signal and the noise-reduced reception signal. The cross-correlation function is calculated after noise of the reception signal is reduced using multiple reception signals. This procedure reduces the number of computations for the cross-correlation function causing a high computational load, thus enabling fast processing.

The first vibrator and the second vibrator may face each other across the pipe. The first vibrator and the second vibrator may be at different positions in a longitudinal direction of the pipe.

The propagation time measurement device may further include a switch that causes the transmission signal to be input into the second vibrator and causes the reception signal to be output from the first vibrator receiving the acoustic signal transmitted from the second vibrator. The signal processor may determine the propagation time of the acoustic signal from the second vibrator to the first vibrator through cross-correlation analysis between the transmission signal input into the second vibrator and the reception signal output from the first vibrator. This structure allows accurate determination of the propagation time of the acoustic signal propagating downstream and the propagation time of the acoustic signal propagating upstream for the same propagation path.

The signal processor may determine at least one of a flow velocity or a flow rate of the fluid in the pipe based on a difference between the propagation time of the acoustic signal from the first vibrator to the second vibrator and the propagation time of the acoustic signal from the second vibrator to the first vibrator. This allows highly accurate measurement to obtain information about the fluid in the pipe.

One or more aspects of the present invention may be directed to a propagation time measurement device including at least part of the above structure, to, for example, a flow velocity measurement device, a flow rate measurement device, a flowmeter, or a flow sensor, or to, for example, a transmission signal generation device that generates a transmission signal or a transmission circuit. One or more aspects of the present invention may be directed to a propagation time measurement method, a flow velocity measurement method, a flow rate measurement method, or a transmission signal generation method including at least part of the above processes, or to a program for implementing any of these methods or a non-transitory storage medium storing the program. The above structures and processes may be combined with one another in any manner to form one or more aspects of the present invention.

Advantageous Effects

The technique according to the above aspects of the present invention allows highly accurate measurement of propagation time with high robustness to noise.

DETAILED DESCRIPTION

Example Use

Figure 1:
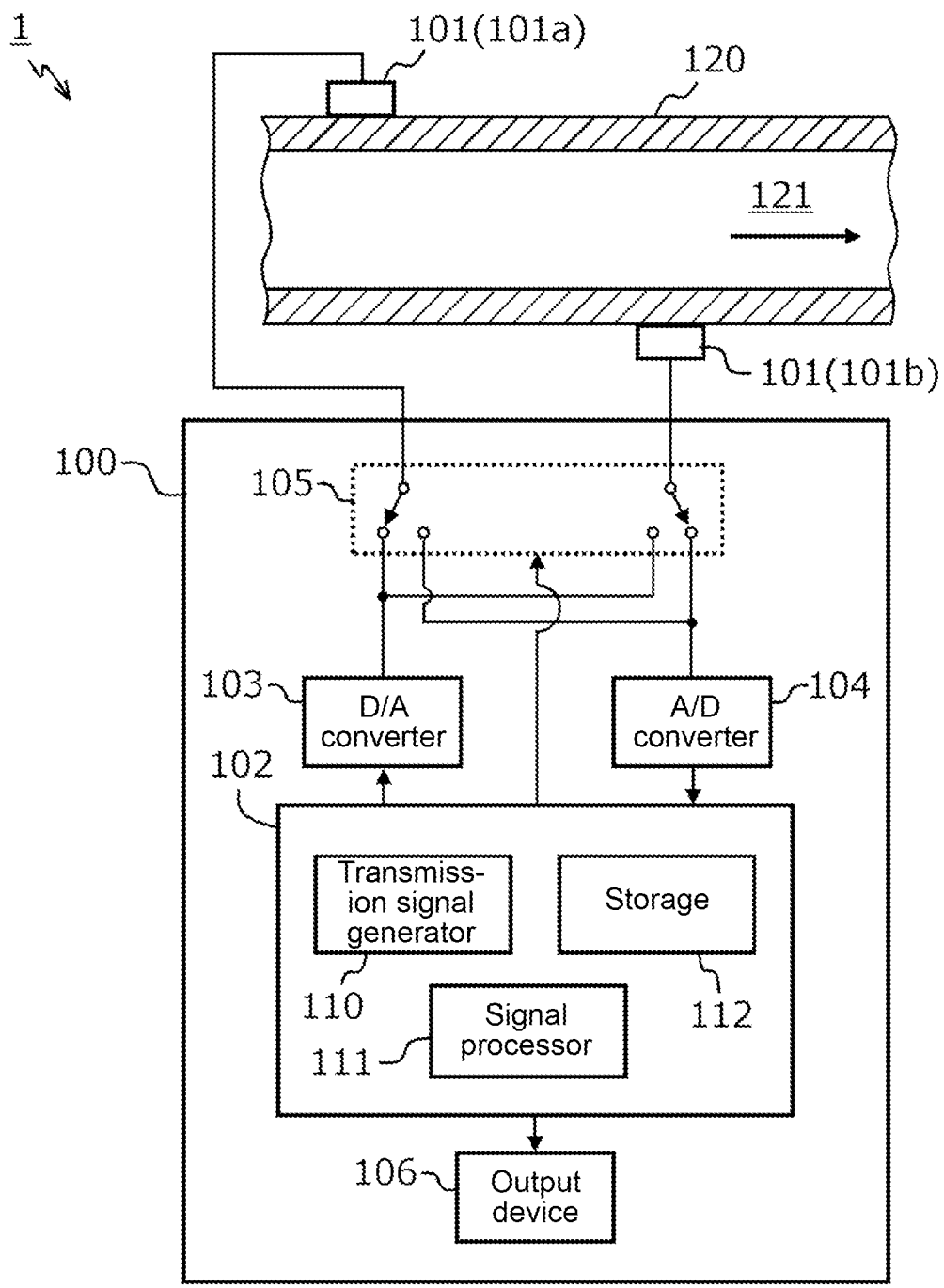
FIG. 1 is a schematic diagram of a propagation time measurement device.

An example use of a propagation time measurement device will be described with reference to FIG. 1.

The propagation time measurement device 1 includes two or more vibrators 101 to receive an acoustic signal transmitted from one vibrator (e.g., vibrator 101a) with another vibrator (e.g., vibrator 101b) and measure the time (propagation time) taken for the acoustic signal to propagate on a path between the two vibrators. The vibrators 101 are at different positions relative to a pipe 120. The acoustic signal propagating between the two vibrators 101 thus travels through (crosses) the pipe 120. The propagation time of the acoustic signal is not constant, but varies in accordance with the state (e.g., flow velocity, flow rate, or any presence of bubbles or foreign matter) of a fluid 121 flowing in the pipe 120. Thus, the propagation time measured by the propagation time measurement device 1 can be used to measure the state of the fluid 121 in the pipe 120 nondestructively.

The fluid 121 can be any substance that can transmit acoustic signals, including a liquid and a gas. Acoustic signals are typically ultrasonic, but may include audible sound waves.

The propagation time measurement device 1 uses cross-correlation analysis to calculate the propagation time. For example, a transmission signal is an electric signal for driving the transmitting vibrator 101, and a reception signal is an electric signal output from the receiving vibrator 101. The propagation time measurement device 1 calculates the cross-correlation function between the transmission signal and the reception signal and determines the lag (time delay) of the reception signal to the transmission signal based on the position of the maximum peak in the cross-correlation function. This lag corresponds to the propagation time of the acoustic signal from the transmitting vibrator 101 to the receiving vibrator 101.

When the signal waveform of the transmission signal is retained sufficiently in the reception signal, a distinctive peak occurs in the cross-correlation function. Thus, the lag (or propagation time) between the two signals can be determined accurately. However, in real situations, the acoustic signal is attenuated while propagating through the pipe 120 and the fluid 121, with noise from various factors superimposed on the acoustic signal. This causes waveform distortion of the reception signals. The cross-correlation function thus has undistinctive peaks, degrading the estimation accuracy of peak positions and possibly causing erroneous selection of a peak other than a correct peak. A pulse or a burst signal as the transmission signal, as in known ultrasonic flowmeters, is susceptible to such attenuation and noise. Flowmeters that can measure low flow rates are now awaited. Such flowmeters are to measure the propagation time with the accuracy of, for example, nanosecond order to picosecond order.

The propagation time measurement device 1 thus uses a transmission signal designed to be highly robust against attenuation of the acoustic signal and noise in measurement. More specifically, the propagation time measurement device 1 may generate a transmission signal with the waveform and the duration satisfying conditions 1 and 2 below.

Condition 1. The ratio of the height of each peak other than the maximum peak in the autocorrelation function of the transmission signal to the height of the maximum peak is 0.8 or less.

Condition 2. The duration of the transmission signal is at least five times the shortest period of the transmission signal or at least 20 times the half width at half maximum of the autocorrelation function of the transmission signal.

For a highly periodic transmission signal, the cross-correlation function between the transmission signal and the reception signal has peaks repeatedly occurring at intervals corresponding to the periods of the waveform of the transmission signal. A reception signal with a well-retained signal waveform allows the maximum peak to be more easily distinguishable from other peaks. However, as described above, the waveform can be distorted by attenuation and noise and may increase misidentification of the maximum peak in the cross-correlation function for a highly periodic transmission signal. Condition 1 defines the transmission signal not to be too periodic.

Figure 2A:
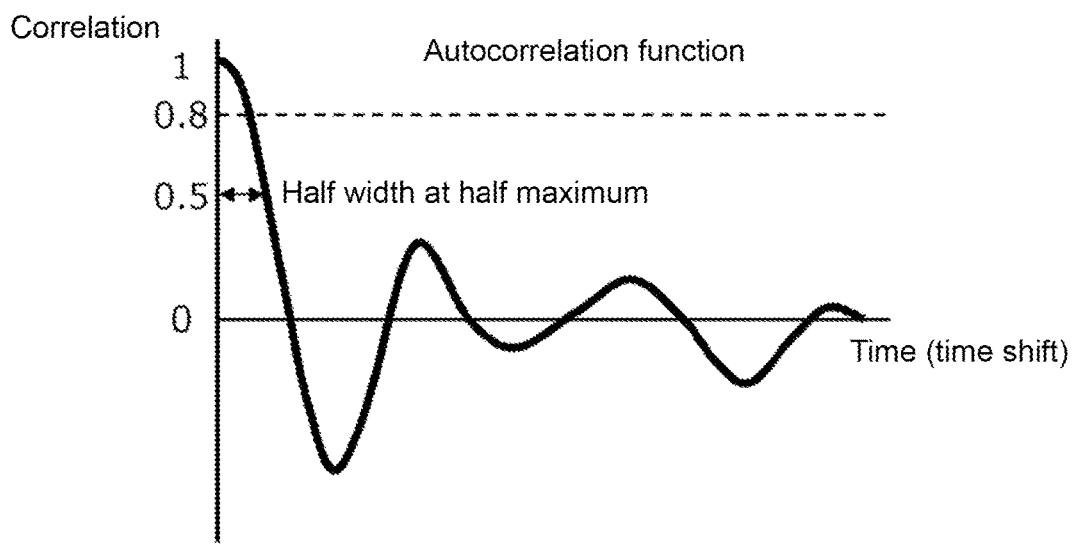
FIG. 2A is a diagram of an example autocorrelation function of a transmission signal.

FIG. 2A shows an example autocorrelation function of a transmission signal. The horizontal axis represents time (time shift), and the vertical axis represents the value of autocorrelation normalized to have the maximum peak height of 1. The autocorrelation function of the transmission signal is the correlation between the transmission signal and a time-shifted signal of the transmission signal. The maximum peak occurs at the time shift being zero (at which the two signals overlap completely). For a transmission signal having a periodic waveform, peaks also occur at positions corresponding to the periods. When condition 1 is satisfied, or more specifically, when the ratio of the height of each peak other than the maximum peak to the height of the maximum peak is 0.8 or less, the waveform of the transmission signal is sufficiently less periodic. In this case, the cross-correlation function between the transmission signal and the reception signal also has a difference between the maximum peak and the other peaks large enough to reduce misidentification of the maximum peak resulting from any waveform distortion of the reception signal due to attenuation or noise.

Figure 2B:
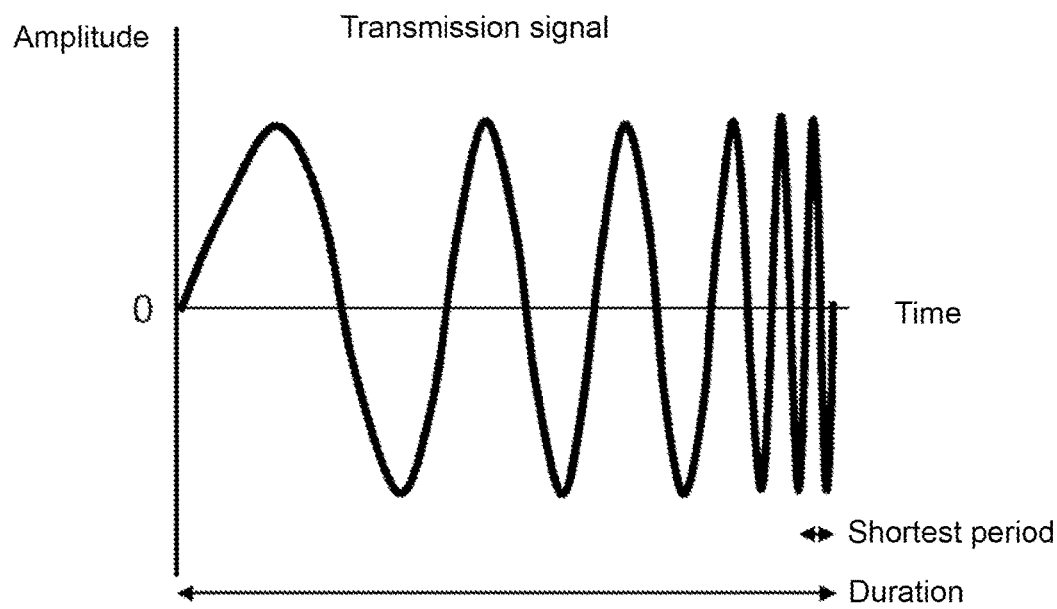
FIG. 2B is a diagram of an example transmission signal.

Condition 2 defines the signal duration to reduce errors in the cross-correlation function. FIG. 2B shows an example transmission signal. The horizontal axis represents time, and the vertical axis represents amplitude. As shown in FIG. 2B, the duration of the transmission signal is the full time length of the transmission signal. The shortest period of the transmission signal is a period for a frequency-modulated transmission signal corresponding to the reciprocal of the maximum frequency in the transmission signal. The half width at half maximum of the autocorrelation function is the time shift by which the height of the maximum peak (the peak occurring at the time shift of zero) of the autocorrelation function is halved, as shown in FIG. 2A. Any transmission signal without the shortest period is to satisfy the latter part of condition 2. Any transmission signal with the shortest period is to satisfy either of the former or latter part of condition 2.

A signal with a shorter duration has less information to undergo cross-correlation analysis. Such a signal is thus susceptible to noise contained in the reception signal and increases errors in the cross-correlation function. This can degrade the estimation accuracy of peak positions and cause misidentification of the maximum peak. In contrast, a signal having a duration satisfying at least condition 2 is expected to reduce errors in the cross-correlation function, allowing accurate estimation of the peak position.

A signal having a longer duration is expected to reduce errors more effectively. In this case, condition 2 may be replaced by a stricter condition 3.

Condition 3. The duration of the transmission signal is at least 10 times the shortest period of the transmission signal or at least 40 times the half width at half maximum of the autocorrelation function of the transmission signal.

In addition to conditions 1 and 2 or conditions 1 and 3, condition 4 below may be added. Condition 4 defines the maximum duration of the signal.

Condition 4. The duration of the transmission signal is shorter than the minimum propagation time estimated as the propagation time of the acoustic signal from the transmitting vibrator to the receiving vibrator.

The propagation time of the acoustic signal varies between when the acoustic signal propagates in the direction in which the fluid flows and when the acoustic signal propagates in the direction opposite to the direction of the fluid flow. The propagation time also varies depending on the propagation path, medium, and flow velocity. For example, the sizes and relative positions of the pipe and the vibrators, the characteristics of the medium through which the signal propagates, the flow velocity of the fluid, the angle of propagation, and the direction of propagation (propagating downstream or upstream) may be determined to pre-estimate the range of propagation times possibly taken by the acoustic signal. For example, with the minimum propagation time being Tmin and the maximum propagation time being Tmax, the duration of the transmission signal is to be set shorter than Tmin.

Acoustic signals are attenuated during propagation, and thus the reception signal level is much lower than the transmission signal level. Thus, any overlap between the transmission period of the transmission signal and the reception period of the reception signal can cause the transmission signal to be mixed into the reception signal through stray capacitance in the circuit and increase the noise in the reception signal. With the maximum duration of the transmission signal set to satisfy condition 4, the transmission period and the reception period can avoid overlapping each other. Thus, any transmission signal mixed into the path of the reception signal does not affect signal analysis. When any other measure is taken to prevent mixing of the signal or when the noise resulting from the signal mixing is negligible, condition 4 (or the maximum duration) may not be satisfied.

First Embodiment (Device Structure)

Figure 3:
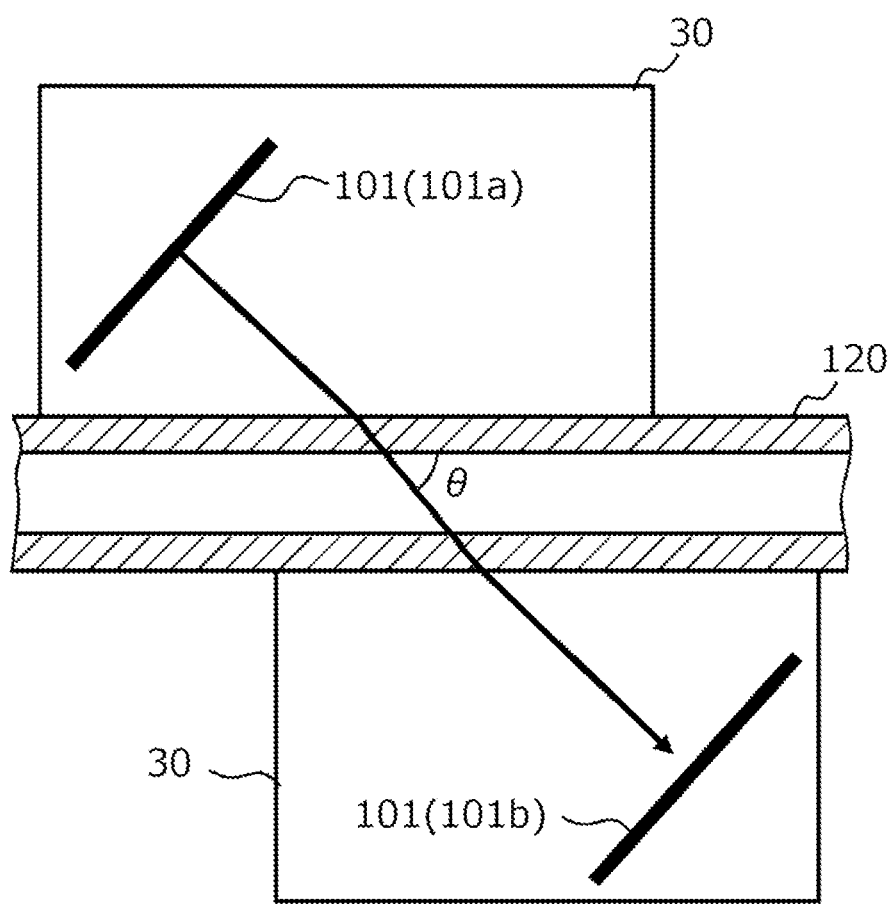
FIG. 3 is a cross-sectional view of example vibrators mounted on a pipe.

The specific structure of the propagation time measurement device 1 will be described with reference to FIGS. 1 and 3. FIG. 1 is schematic block diagram of the propagation time measurement device 1. FIG. 3 is a cross-sectional view of example vibrators mounted on a pipe. The propagation time measurement device 1 according to the present embodiment nondestructively measures the flow velocity and the flow rate of a fluid 121 flowing in a pipe 120. The device is also referred to as an ultrasonic flowmeter or an ultrasonic flow sensor.

The propagation time measurement device 1 includes a main body 100 and multiple vibrators 101. The main body 100 and each vibrator 101 are connected with a cable. In the present embodiment, the structure includes two vibrators 101, or more specifically, a first vibrator 101a upstream in the longitudinal direction of the pipe 120 and a second vibrator 101b downstream from the first vibrator 101a (the two vibrators are hereafter referred to as the first vibrator 101a and the second vibrator 101b when distinguished from each other and simply as vibrators 101 when their common features are described). The structure may include three or more vibrators 101, rather than two vibrators 101.

The vibrators 101 convert an electrical signal to an acoustic signal and an acoustic signal to an electric signal. The vibrators 101 may also be referred to as transducers. For example, the vibrators 101 may be, for example, piezoelectric elements that use the piezoelectric effect to convert a force to a voltage and a voltage to a force. As shown in FIG. 3, each vibrator 101 is buried in a resin clamp 30. When the clamp 30 holds the pipe 120, the two vibrators 101a and 101b face each other across the pipe 120. The line segment connecting the two vibrators 101a and 101b extends at a predetermined angle θ with the axis of the pipe 120. This clamp structure facilitates mounting of the vibrators 101 onto the existing pipe 120 at appropriate positions (without any modification to the pipe 120). Any grease or gel applied between the pipe 120 and the clamp 30 can tightly connect them together and increase the impedance matching between them. The angle θ is the propagation angle of the acoustic signal. Although the propagation angle θ may be set to any angle, it may be 0<θ<90 degrees, or more specifically, 20<θ<60 degrees to use transit-time described below.

The main body 100 mainly includes a control circuit 102, a digital-to-analog (D/A) converter 103, an analog-to-digital (A/D) converter 104, a switch 105, and an output device 106. The control circuit 102 controls the components of the propagation time measurement device 1 and performs, for example, signal processing and computations. The D/A converter 103 performs D/A conversion and signal amplification based on the transmission signal (digital data) input from the control circuit 102 and outputs a transmission signal (analog signal) at a predetermined voltage to one of the vibrators 101. The A/D converter 104 converts the reception signal (analog signal) input from another vibrator 101 to digital data at predetermined sampling intervals and outputs the reception signal (digital data) to the control circuit 102. The switch 105 changes the connection of the D/A converter 103 and the A/D converter 104 with the first vibrator 101a and the second vibrator 101b. The vibrator 101 connected to the D/A converter 103 serves as a transmitter, and the vibrator 101 connected to the A/D converter 104 as a receiver. The output device 106 outputs information such as the results of signal processing and computations performed by the control circuit 102. For example, the output device 6 is a display. The main body 100 may also include an input device (e.g., buttons or a touch panel) for user operations and a communication circuit (e.g., Wi-Fi module) to transmit information to an external device (e.g., an external computer or a server).

As shown in FIG. 1, the control circuit 102 includes a transmission signal generator 110, a signal processor 111, and a storage 112. The transmission signal generator 110 generates transmission signal data for measurement and outputs the data to the D/A converter 103. The signal processor 111 calculates the propagation time of the acoustic signal based on the transmission signal and the reception signal and also calculates the flow velocity, the flow rate, or both of the fluid based on the propagation time. The storage 112 stores waveform data that defines the waveform of the transmission signal. The storage 112 can store multiple types of waveform data. The transmission signal generator 110 selects the appropriate type of waveform data from the storage 112 and generates the transmission signal data.

The control circuit 102 is, for example, a computer including a central processing unit (CPU), a random-access memory (RAM), a nonvolatile storage (e.g., read-only memory or ROM, a flash memory, or a hard disk drive), an input device, and an output device. In this case, the CPU loads the program stored in the storage into the RAM and executes the program to implement the transmission signal generator 110 and the signal processor 111. Any computer may be used. For example, the computer may be a personal computer, an embedded computer, a smartphone, or a tablet. In some embodiments, all or part of the functions provided by the control circuit 102 may be implemented by a circuit such as an application-specific integrated circuit (ASIC) or a field-programmable gate array (FPGA). In some embodiments, distributed computing and cloud computing may allow the control circuit 102 to cooperate with other computers to perform the processing described later.

The pipe 120 may be formed from any material, and have any size and any shape. For example, the pipe 120 may be a metal pipe or a resin pipe. The pipe 120 may be sized in accordance with the standard defined by Japanese Industrial Standards (JIS) or the American National Standards Institute (ANSI), or sized individually. The method in the present embodiment allows highly accurate measurement of low flow rates, and thus is particularly effective in measuring small pipes, such as ⅛-inch pipes (OD: 3.18 mm, ID: 1.59 mm), ¼-inch pipes (OD: 6.35 mm, ID: 3.97 mm), and ½-inch pipes (OD: 12.70 mm, ID: 9.53 mm). The pipe may be bent or curved, rather than straight, and may have any cross section.

(Transmission Signal for Measurement)

The propagation time measurement device 1 according to the present embodiment performs measurement with a transmission signal designed to satisfy conditions 1 and 2 or conditions 1 and 3 described above. Example transmission signals satisfying these conditions will now be described.

Figure 4A:
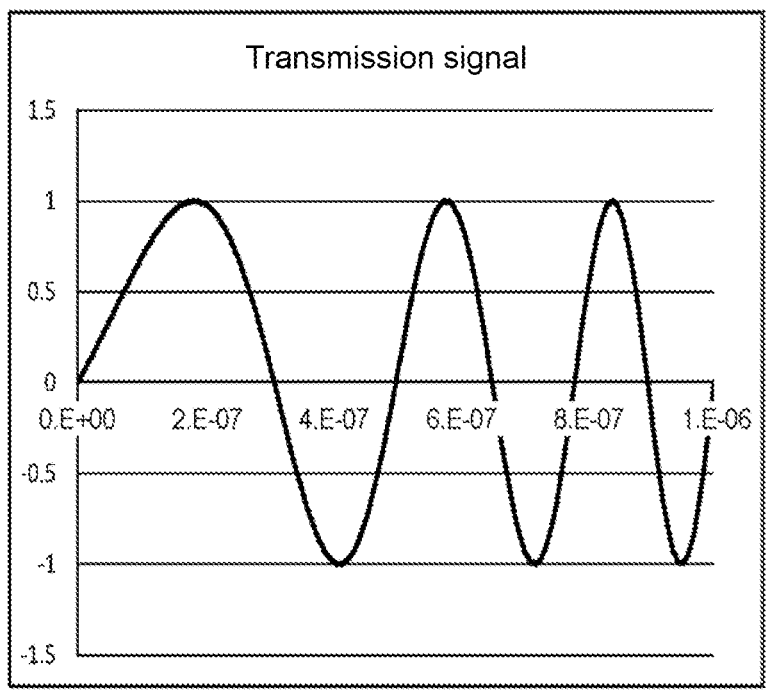
FIG. 4A is a diagram of an example frequency modulated signal.
Figure 4B:
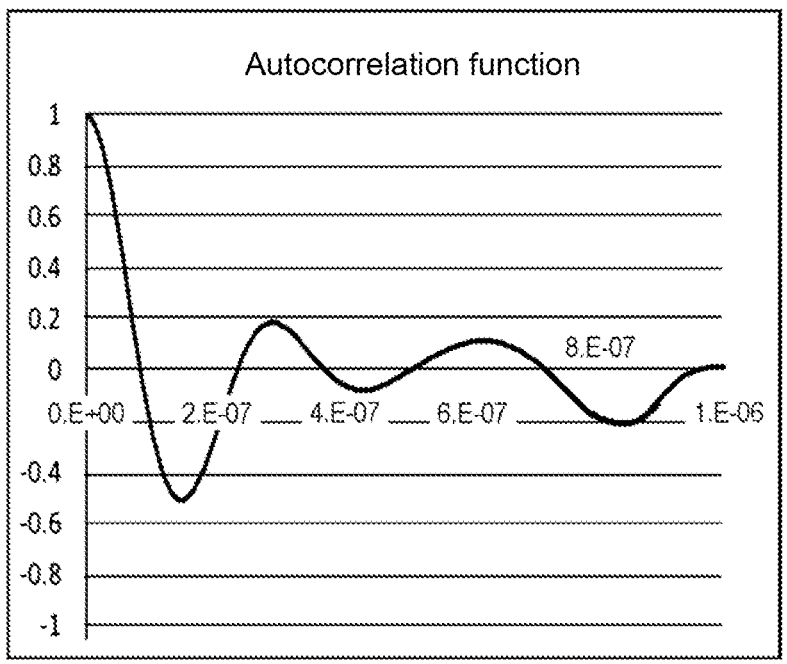
FIG. 4B is a diagram of the autocorrelation function of the transmission signal in FIG. 4A.

FIG. 4A shows an example frequency-modulated signal. The horizontal axis represents time, and the vertical axis represents amplitude (normalized to have the maximum amplitude of 1). The transmission signal in FIG. 4A has a duration of one microsecond and a frequency that increases linearly with time from 1 to 5 MHz. FIG. 4B shows the autocorrelation function of the transmission signal in FIG. 4A. The horizontal axis represents time, and the vertical axis represents the value of the autocorrelation function (normalized to have the maximum peak value of 1 when the shift is zero). In FIG. 4B, the second peak value in the autocorrelation function is about 0.2, indicating that the transmission signal in FIG. 4A satisfies condition 1. The transmission signal in FIG. 4A has the shortest period of 0.2 microseconds (the wavelength corresponding to 5 MHz) and a duration that is five times the shortest period. The transmission signal in FIG. 4A thus satisfies condition 2 as well.

The effect of the transmission signal in FIG. 4A was verified with a simulated system including the two vibrators 101a and 101b mounted on a Teflon (registered trademark) ⅛-inch pipe at an angle θ of 45 degrees. A reception signal to be received by the second vibrator 101b in response to an input of the transmission signal in FIG. 4A into the first vibrator 101a was determined. The cross-correlation function between the transmission signal and the reception signal was calculated. The simulation results do not show lower estimation accuracy of peak positions or misidentification of the maximum peak with any attenuated reception signal or under any noise condition, thus verifying accurate determination of the propagation time. In the simulation, the propagation time of the acoustic signal between the two vibrators is about three microseconds. Thus, the duration of the transmission signal (one microsecond) also satisfies condition 4.

Figure 5A:
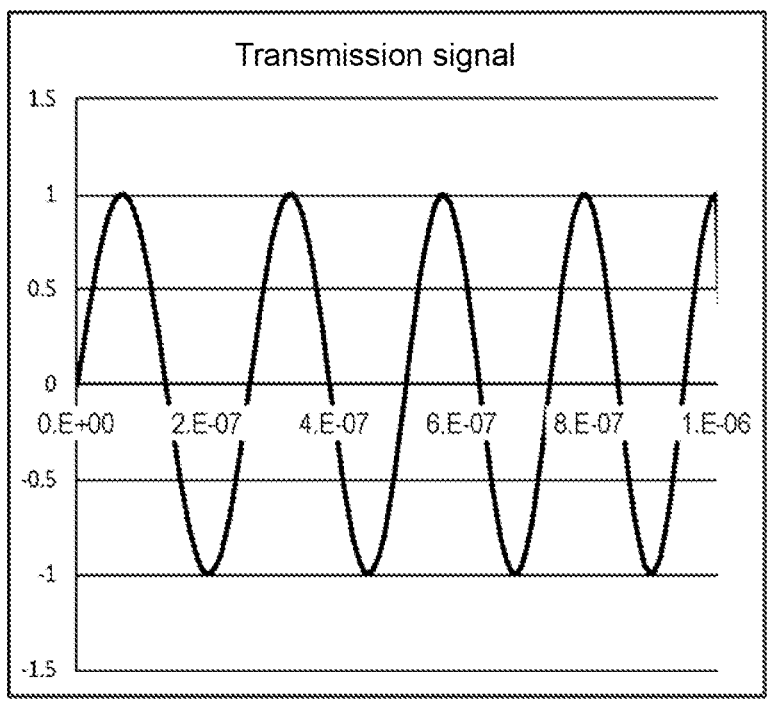
FIG. 5A is a diagram of an example frequency modulated signal.
Figure 5B:
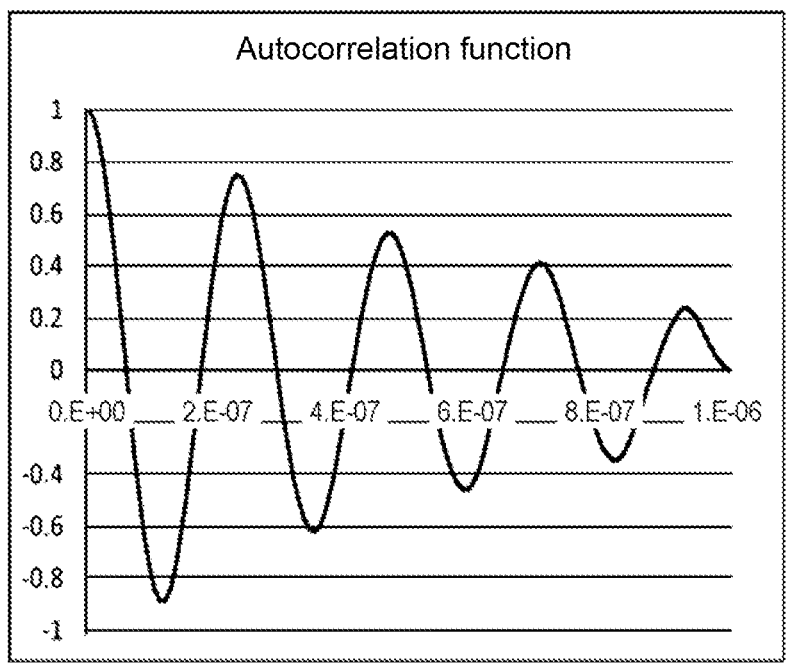
FIG. 5B is a diagram of the autocorrelation function of the transmission signal in FIG. 5A.

FIG. 5A shows another example frequency-modulated signal. The horizontal axis represents time, and the vertical axis represents amplitude (normalized to have the maximum amplitude of 1). The transmission signal in FIG. 5A has a duration of one microsecond and a frequency that increases linearly with time from 3.5 to 5 MHz. FIG. 5B shows the autocorrelation function of the transmission signal in FIG. 5A. The horizontal axis represents time, and the vertical axis represents the value of the autocorrelation function (normalized to have the maximum peak value of 1 when the shift is zero). In FIG. 5B, the second peak value in the autocorrelation function is about 0.75, indicating that the transmission signal in FIG. 5A satisfies condition 1. The transmission signal in FIG. 5A has the shortest period of 0.2 microseconds (the wavelength corresponding to 5 MHz) and a duration that is five times the shortest period. The transmission signal in FIG. 5A thus satisfies condition 2 as well.

The same simulation described above was performed with the transmission signal in FIG. 5A. The results do not show lower estimation accuracy of peak positions or misidentification of the maximum peak with any attenuated reception signal or under any noise condition, thus verifying accurate determination of the propagation time. In this simulation, the transmission signal in FIG. 5A also satisfies condition 4.

Figure 6A:
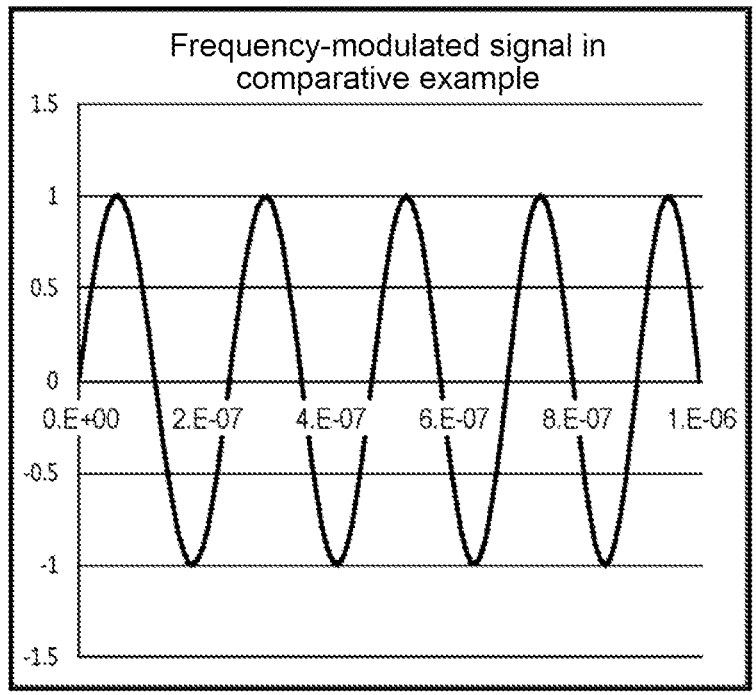
FIG. 6A is a diagram of a frequency modulated signal in a comparative example.
Figure 6B:
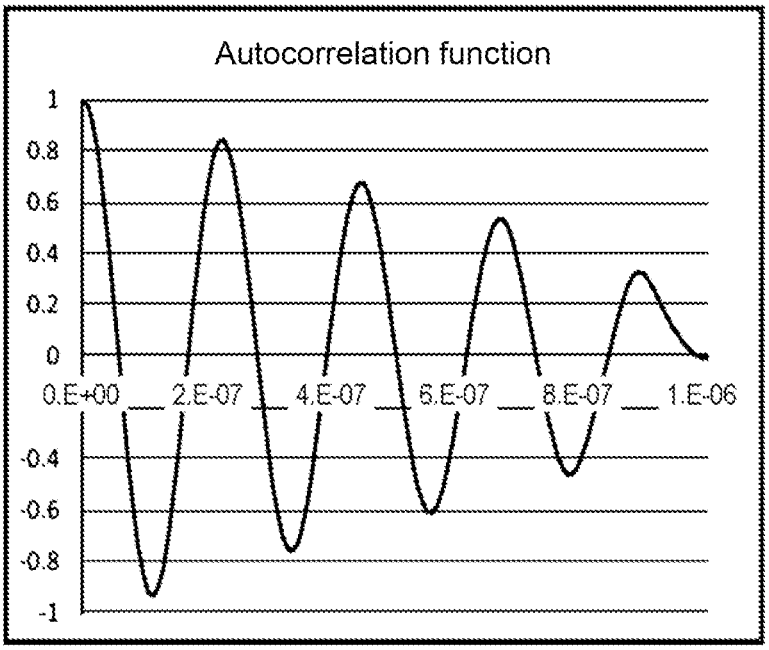
FIG. 6B is a diagram of the autocorrelation function of the frequency modulated signal in FIG. 6A.

FIG. 6A shows a frequency-modulated signal in a comparative example. The transmission signal in FIG. 6A has a duration of one microsecond and a frequency that increases linearly with time from 4 to 5 MHz. FIG. 6B shows the autocorrelation function of the transmission signal in FIG. 6A. In FIG. 6B, the second peak value in the autocorrelation function is greater than 0.8, indicating that the transmission signal in FIG. 6A does not satisfy condition 1. The same simulation described above was performed with the transmission signal in FIG. 6A. The results show the likelihood of lower estimation accuracy of peak positions and misidentification of the maximum peak with an attenuated reception signal or under a noise condition.

Although the signals in the example in FIGS. 4A and 5A have frequencies that increase linearly with time, the frequency may be modulated in different manners. For example, the signal may have a frequency that decreases with time or have a frequency that increases or decreases nonlinearly (e.g., exponentially) with time.

Figure 7A:
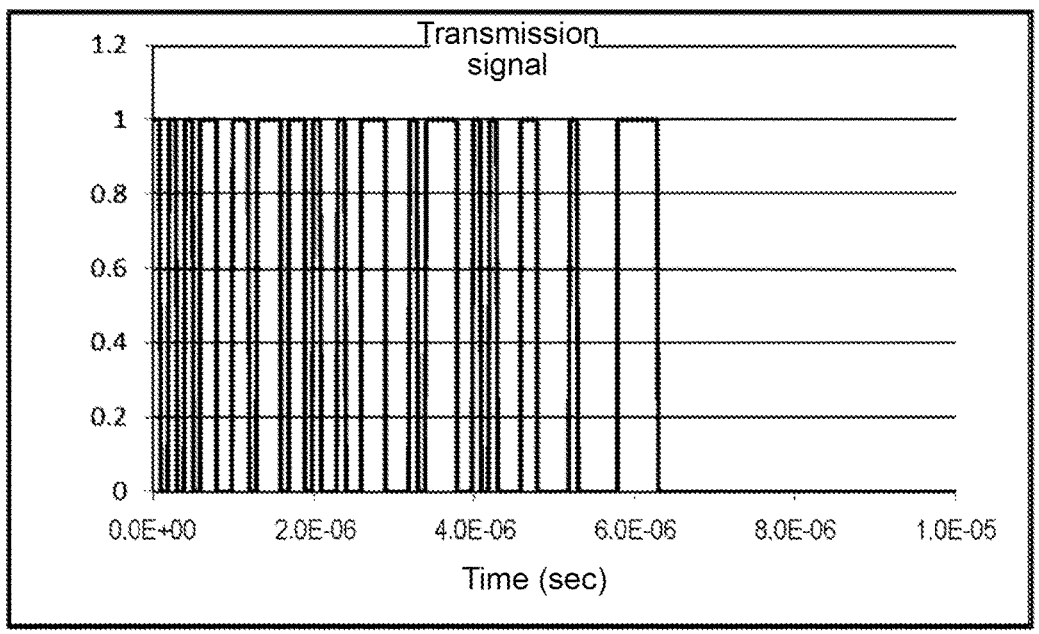
FIG. 7A is a diagram of an example transmission signal including random pulses.
Figure 7B:
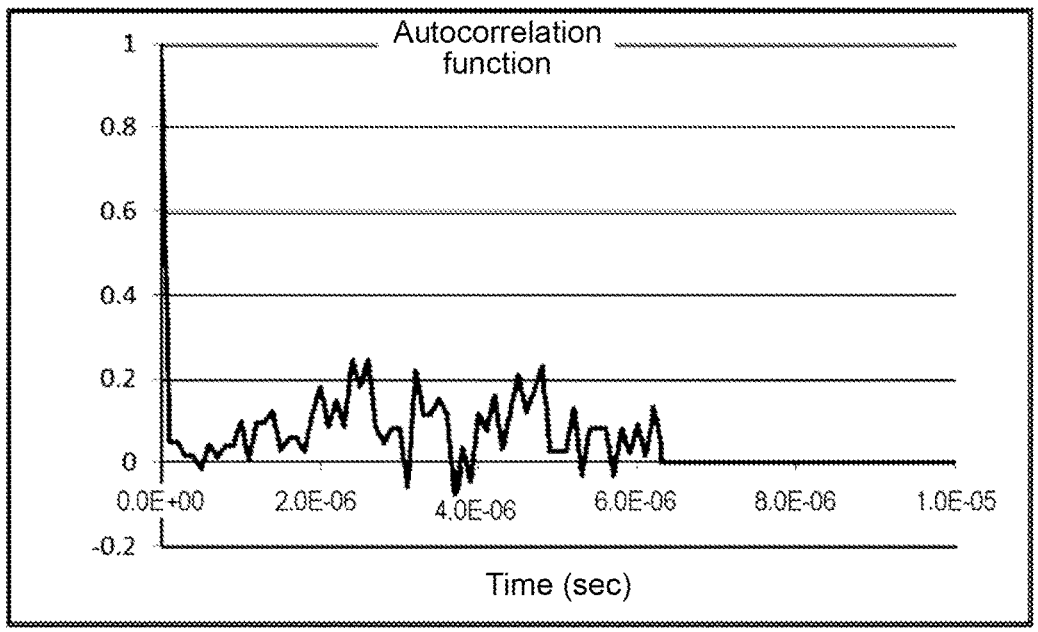
FIG. 7B is a diagram of the autocorrelation function of the transmission signal in FIG. 7A.

FIG. 7A shows an example transmission signal including random pulses. The horizontal axis represents time, and the vertical axis represents amplitude (normalized to have the maximum amplitude of 1). The transmission signal in FIG. 7A has a duration of 6.2 microseconds and includes a combination of multiple pulses with random widths. FIG. 7B shows the autocorrelation function of the transmission signal in FIG. 7A. The horizontal axis represents time, and the vertical axis represents the value of the autocorrelation function (normalized to have the maximum peak value of 1 when the shift is zero). In FIG. 7B, the second peak value in the autocorrelation function is about 0.25, indicating that the transmission signal in FIG. 7A satisfies condition 1. The transmission signal in FIG. 7A in the autocorrelation function has the maximum peak that falls sharply, distinctively indicating that the signal duration is at least 20 times the half width at half maximum. Thus, the transmission signal in FIG. 7A satisfies condition 2 as well.

The same simulation described above was performed with the transmission signal in FIG. 7A. The results do not show lower estimation accuracy of peak positions or misidentification of the maximum peak with any attenuated reception signal or under any noise condition, thus verifying accurate determination of the propagation time.

Figure 8A:
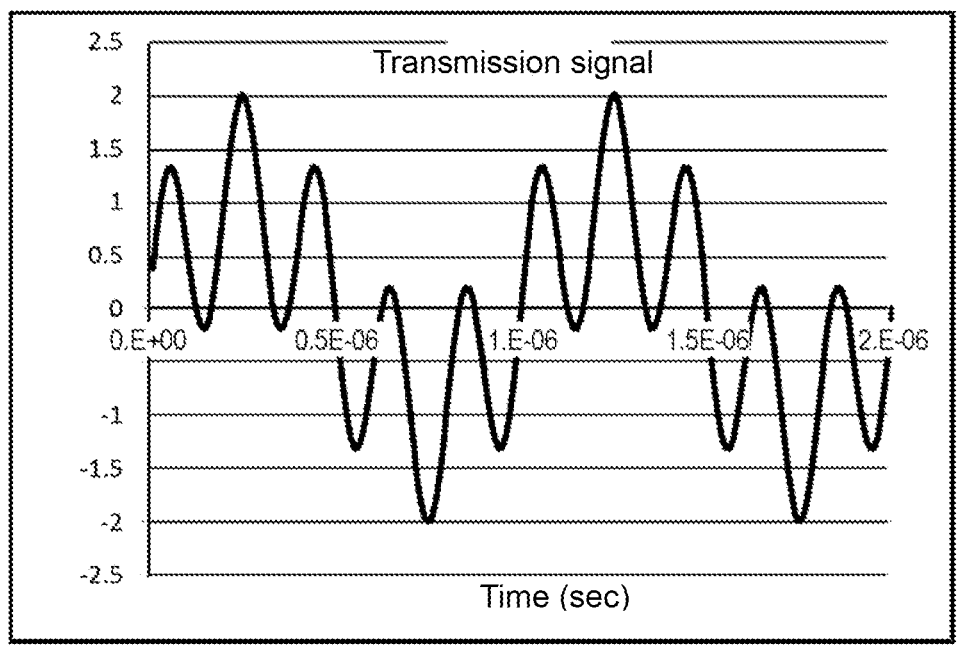
FIG. 8A is a diagram of an example transmission signal including multiple signals having different frequencies combined together.
Figure 8B:
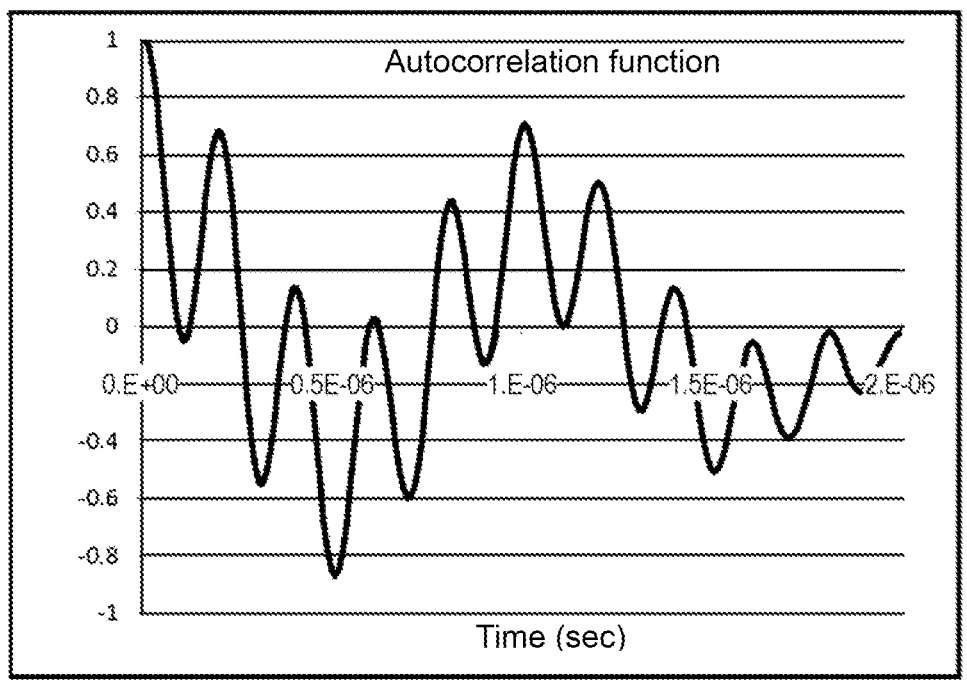
FIG. 8B is a diagram of the autocorrelation function of the transmission signal in FIG. 8A.

FIG. 8A shows an example transmission signal including multiple signals having different frequencies combined together, with a signal component of 1 MHz and a signal component of 5 MHz superimposed on each other. The horizontal axis represents time, and the vertical axis represents amplitude (normalized to have the maximum amplitude of 1). The transmission signal in FIG. 8A has a duration of two microseconds. FIG. 8B shows the autocorrelation function of the transmission signal in FIG. 8A. The horizontal axis represents time, and the vertical axis represents the value of the autocorrelation function (normalized to have the maximum peak value of 1 when the shift is zero). In FIG. 8B, the second peak value in the autocorrelation function is about 0.7, indicating that the transmission signal in FIG. 8A satisfies condition 1. The transmission signal in FIG. 8A has the shortest period of 0.2 microseconds (the wavelength corresponding to 5 MHz) and a duration that is 10 times the shortest period. The transmission signal in FIG. 8A thus satisfies condition 3 as well.

The same simulation described above was performed with the transmission signal in FIG. 8A. The results do not show lower estimation accuracy of peak positions or misidentification of the maximum peak with any attenuated reception signal or under any noise condition, thus verifying accurate determination of the propagation time. In this simulation, the transmission signal in FIG. 8A satisfies condition 4 as well.

Figure 9A:
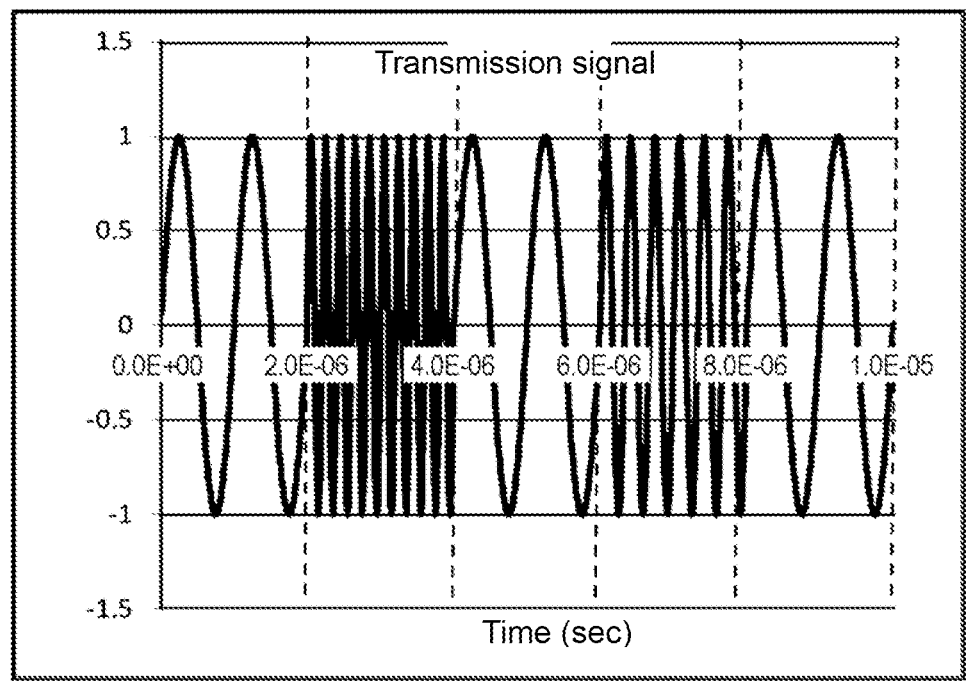
FIG. 9A is a diagram of an example transmission signal having a frequency that changes at predetermined time segments.
Figure 9B:
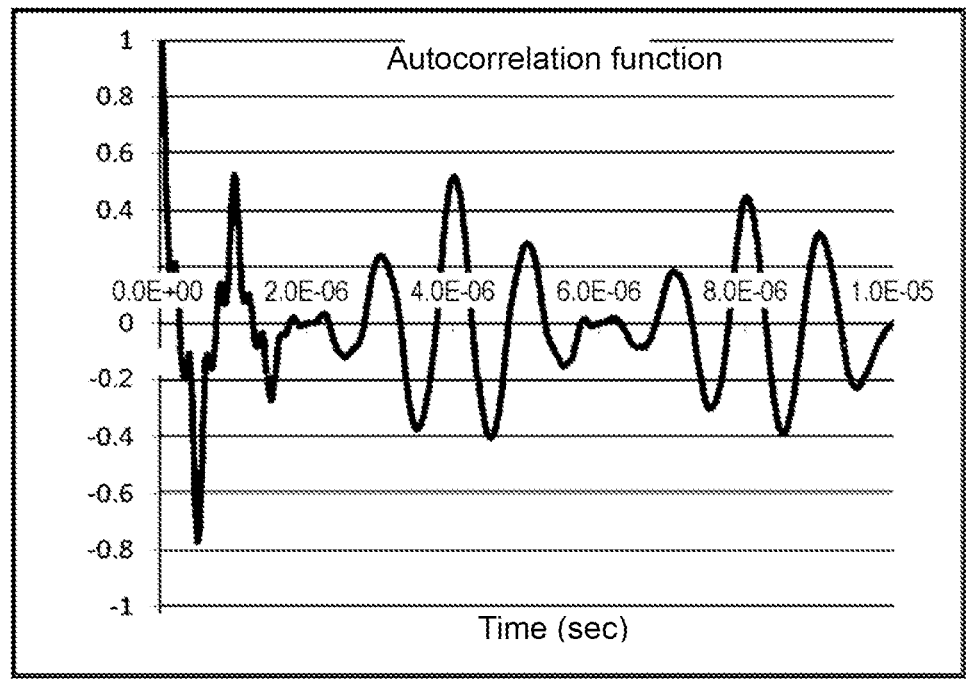
FIG. 9B is a diagram of the autocorrelation function of the transmission signal in FIG. 9A.

FIG. 9A shows an example transmission signal with a frequency that changes at predetermined time segments. The horizontal axis represents time, and the vertical axis represents amplitude (normalized to have the maximum amplitude of 1). In this example, the frequency changes every two microseconds in the order of 1 MHz, 5 MHz, 1 MHz, 3 MHz, and 1 MHz. The transmission signal in FIG. 9A has a duration of 10 microseconds. FIG. 9B shows the autocorrelation function of the transmission signal in FIG. 9A. The horizontal axis represents time, and the vertical axis represents the value of the autocorrelation function (normalized to have the maximum peak value of 1 when the shift is zero). In FIG. 9B, the second peak value in the autocorrelation function is about 0.5, indicating that the transmission signal in FIG. 9A satisfies condition 1. The transmission signal in FIG. 9A has the shortest period of 0.2 microseconds (the wavelength corresponding to 5 MHz) and a duration that is 50 times the shortest period. The transmission signal in FIG. 9A thus satisfies condition 3 as well.

The same simulation described above was performed with the transmission signal in FIG. 9A. The results do not show lower estimation accuracy of peak positions or misidentification of the maximum peak with any attenuated reception signal or under any noise condition, thus verifying accurate determination of the propagation time.

(Measurement)

Figure 10:
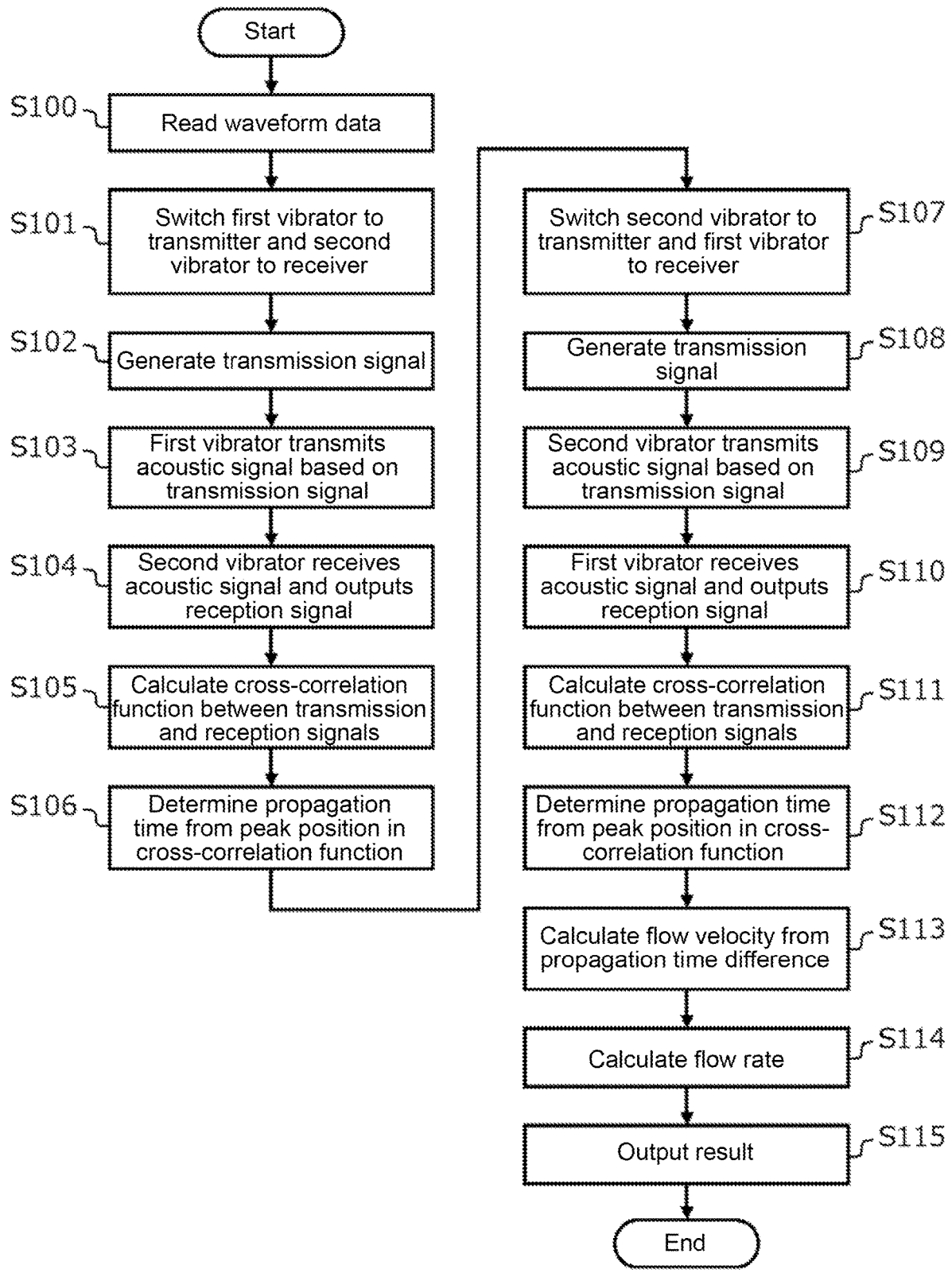
FIG. 10 is a flowchart of measurement performed by a propagation time measurement device according to a first embodiment.

The measurement performed by the propagation time measurement device 1 will be described with reference to the flowchart in FIG. 10.

In step S100, the transmission signal generator 110 in the control circuit 102 reads the waveform data about a transmission signal from the storage 112. The waveform data about the transmission signal is in any format that defines the waveform of a transmission signal. For example, the transmission signal shown in FIGS. 4A and 5A can be defined with parameters such as a signal duration, the range of frequency sweep (start and end frequencies), and amplitude. The transmission signal shown in FIG. 7A can be defined with parameters such as a signal duration, width of each pulse in the transmission signal, and amplitude. The transmission signal shown in FIG. 8A can be defined with parameters such as a signal duration, the frequency of each signal component, and amplitude. The transmission signal shown in FIG. 9A can be defined with parameters such as a signal duration, the length and frequency of each time segment, and amplitude. The waveform data may be in other formats, such as a signal waveform defined by a function and a signal waveform defined by amplitude values at multiple points on a signal waveform.

In step S101, the control circuit 102 controls the switch 105 to connect the D/A converter 103 to the first vibrator 101a and the A/D converter 104 to the second vibrator 101b. The first vibrator 101a thus serves as a transmitter, and the second vibrator 101b as a receiver.

In step S102, the transmission signal generator 110 generates a transmission signal based on the waveform data read in step S100 and outputs the signal to the D/A converter 103. The transmission signal is temporarily stored in a RAM (work memory) for cross-correlation analysis performed later.

Figure 11A:
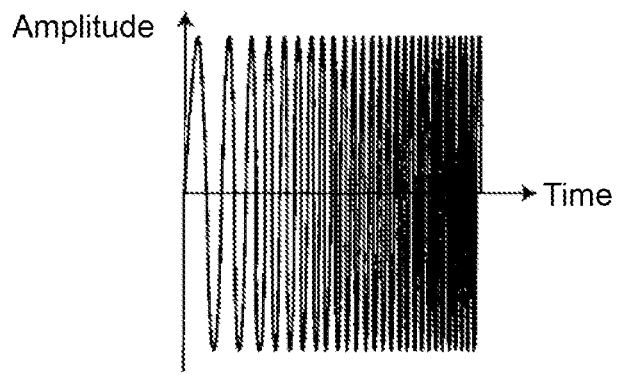
FIG. 11A is a diagram of an example transmission signal.
Figure 11B:
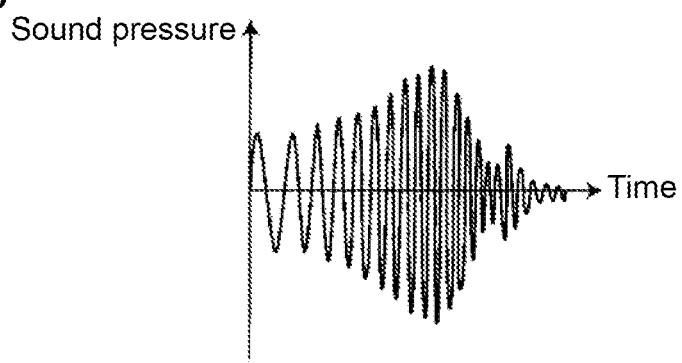
FIG. 11B is a diagram of an example acoustic signal based on the transmission signal in FIG. 11A.

In step S103, the transmission signal resulting from D/A conversion and amplification performed by the D/A converter 103 is input into the first vibrator 101a, which then transmits an acoustic signal based on the transmission signal. FIG. 11A is an example transmission signal (frequency-modulated signal), and FIG. 11B is an example acoustic signal based on the transmission signal in FIG. 11A. In this example, the amplitude of the acoustic signal is not constant irrespective of the constant amplitude of transmission signal due to the frequency response of the vibrator. The acoustic signal travels through the clamp 30, the pipe 120, and the fluid 121 to the second vibrator 101b.

Figure 11C:
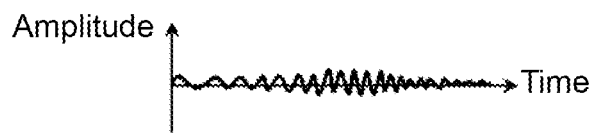
FIG. 11C is a diagram of an example reception signal.

In step S104, the second vibrator 101b converts the received acoustic signal into a reception signal and outputs the signal to the A/D converter 104. FIG. 11C shows an example of the reception signal. The acoustic signal is attenuated during propagation. Thus, the reception signal has amplitude (voltage) on the order of about $\frac{1}{100}$ to $\frac{1}{1000}$ the transmission signal. For example, the transmission signal in FIG. 11A has amplitude of about 30 V, whereas the reception signal in FIG. 11C has amplitude of about 10 mV. Additionally, various noise components are on the reception signal, as shown in FIG. 11C. The reception signal resulting from A/D conversion performed by the A/D converter 104 enters the control circuit 102 and is temporarily stored into the RAM (work memory).

Figure 11D:
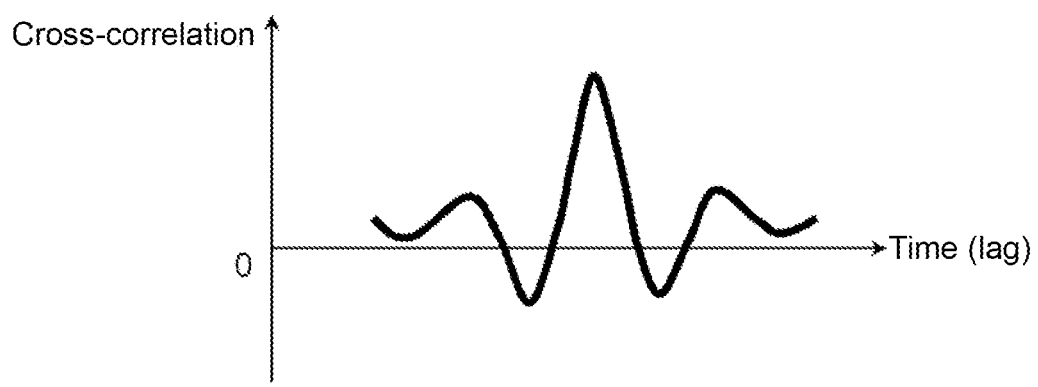
FIG. 11D is a diagram of an example cross-correlation function.

In step S105, the signal processor 111 reads the transmission signal and the reception signal from the RAM and calculates the cross-correlation function between the two signals. FIG. 11D shows an example cross-correlation function, showing the area near the maximum peak alone in an enlarged manner. A distinctive peak occurs at the point corresponding to the lag between the transmission signal and the reception signal. The cross-correlation function is a known technique, and is not described in detail herein.

Figure 12A:
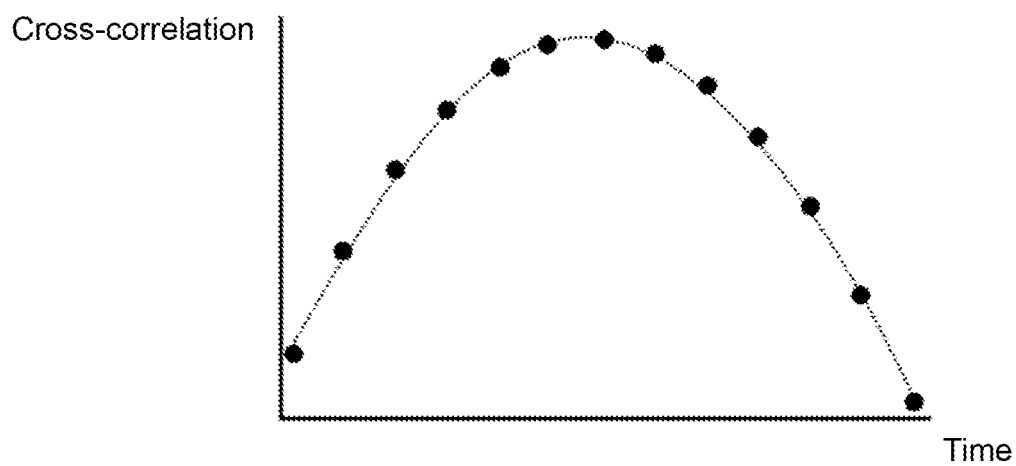
FIG. 12A is an enlarged diagram of the area near the maximum peak of a cross-correlation function.
Figure 12B:
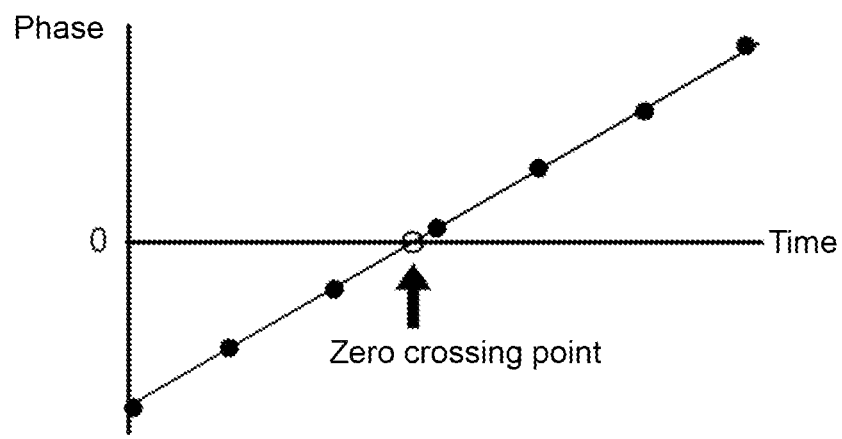
FIG. 12B is a diagram of an example of the Hilbert transform.

In step S106, the signal processor 111 determines the vertex position of the maximum peak in the cross-correlation function. This position corresponds to the propagation time of the acoustic signal from the first vibrator 101a to the second vibrator 101b. Due to the limitation on digital signal processing, the cross-correlation function calculated in step S105 is represented as discrete data. Thus, as shown in FIG. 12A, the points at which the cross-correlation function data is obtained (the points indicated by solid circles) may not match the vertex positions of the peak. The signal processor 111 may thus approximate the shape of the maximum peak from the discrete data for the cross-correlation function and then estimate the vertex position of the maximum peak. For example, as shown in FIG. 12B, the signal processor 111 may transform the data near the maximum peak in the cross-correlation function to phase data by Hilbert transform, approximate the resultant data linearly, and determine the zero crossing point (the position at which the phase is zero) of the approximate line to be the vertex position of the maximum peak. In some embodiments, the signal processor 111 may estimate the shape of the maximum peak by interpolating the data near the maximum peak in the cross-correlation function by polynomial approximation to determine the vertex position. Such processing can accurately determine the position at which cross-correlation is maximum with a resolution higher than the sampling intervals of A/D conversion, or more specifically, correctly determine the propagation time of the acoustic signal.

In step S107, the control circuit 102 controls the switch 105 to connect the D/A converter 103 to the second vibrator 101b and the A/D converter 104 to the first vibrator 101a. In other words, the transmitting vibrator is switched to the receiving vibrator and the receiving vibrator is to the transmitting vibrator. The processing in subsequent steps S108 to S112 is the same as the processing in steps S102 to S106

(except that the first vibrator 101*a* is replaced with the second vibrator 101*b* and the second vibrator 101*b* with the first vibrator 101*a*).

The processing described above determines a propagation time Tab of the acoustic signal from the first vibrator 101*a* to the second vibrator 101*b* and a propagation time Tba of the acoustic signal from the second vibrator 101*b* to the first vibrator 101*a*. When the fluid 121 flows in the pipe 120, a time difference occurs between the propagation times Tab and Tba depending on the flow velocity of the fluid 121. Thus, the propagation times Tab and Tba can be used to calculate the flow velocity and the flow rate of the fluid 121.

In step S113, the signal processor 111 determines a flow velocity V of the fluid 121 with the formula below.

$$V = \frac{L}{2\cos\theta}\left(\frac{1}{Tba - To} - \frac{1}{Tab - To}\right)$$ [Formula 1]

In the formula, V is the flow velocity of the fluid, L is the length of the propagation path in the pipe, θ is the propagation angle, Tab is the propagation time from the upstream vibrator to the downstream vibrator, Tba is the propagation time from the downstream vibrator to the upstream vibrator, and To is the propagation time for a non-fluid portion. The propagation time To for the non-fluid portion is, for example, the time for the acoustic signal to propagate through the clamp 30 and the pipe 120, and can be predetermined through experiment or simulation based on the specifications of the pipe 120 (e.g., inner diameter, outer diameter, or material).

In step S114, the signal processor 111 determines a flow rate Q of the fluid with the formula below.

$$Q = V \times A$$ [Formula 2]

In the formula, Q is the flow rate of the fluid, V is the flow velocity of the fluid, and A is the hollow cross-section of the pipe. The hollow cross-section A is known in this example.

In step S115, the signal processor 111 outputs the processing results (e.g., propagation time, flow velocity, or flow rate) to the output device 106.

Advantages of Present Embodiment

The structure according to the present embodiment described above uses, as a signal for measurement, the transmission signal satisfying conditions 1 and 2 or conditions 1 and 3, causing the cross-correlation function to have fewer errors and an easily identifiable and distinctive maximum peak. This structure allows accurate determination of the maximum peak position in the cross-correlation function, or more specifically, accurate determination of the propagation time of the acoustic signal. Thus, the structure can be used in highly-accurate measurement situations such as measuring a low flow rate.

Second Embodiment

In a second embodiment of the present invention, the acoustic signal is transmitted and received multiple times through the same propagation path. The multiple resultant reception signals are used in the cross-correlation analysis to improve the measurement accuracy. The basic structure is the same as described in the first embodiment. Thus, the second embodiment will be described focusing on the difference from the first embodiment.

Figure 13:
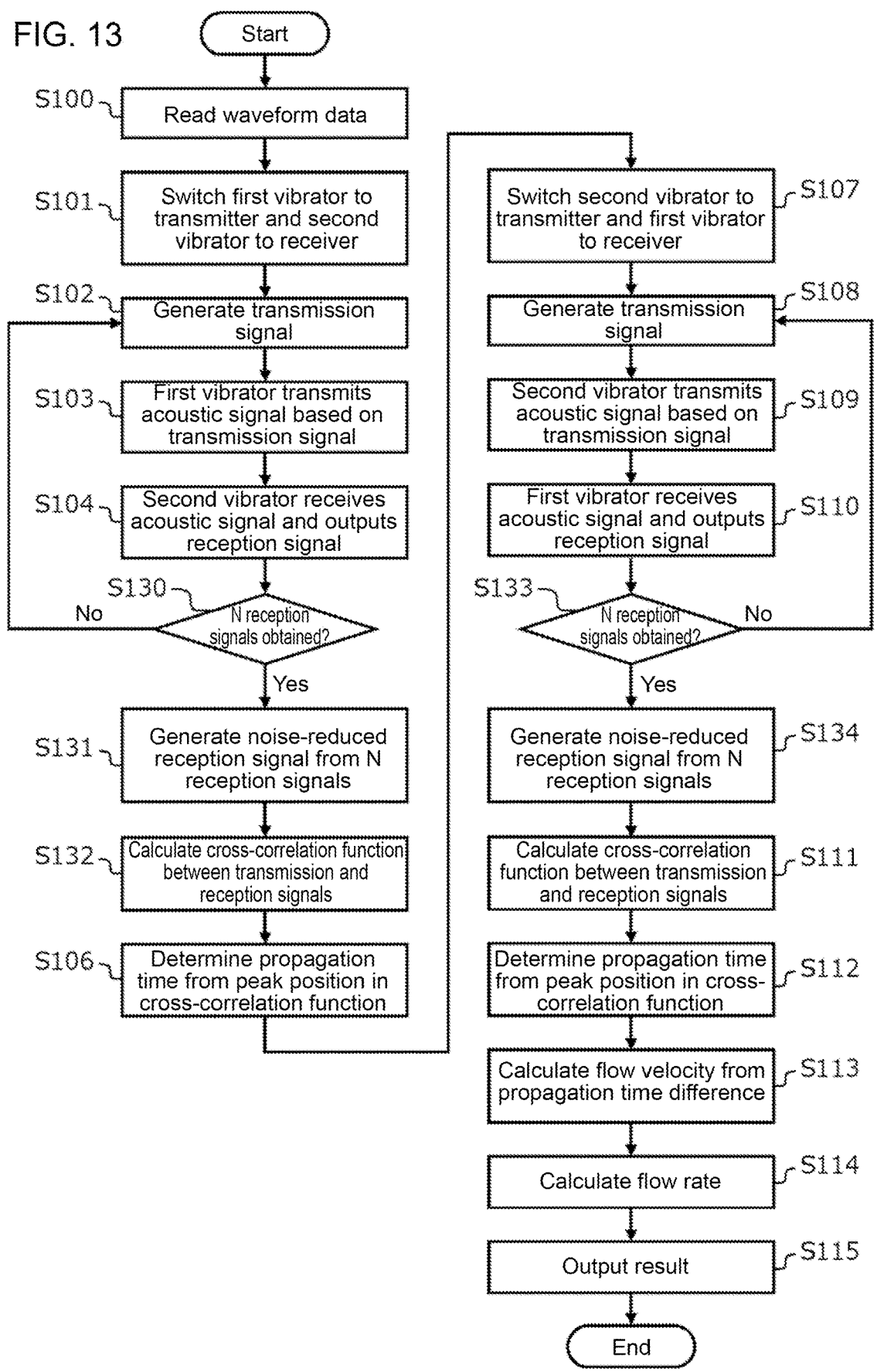
FIG. 13 is a flowchart of measurement performed by a propagation time measurement device according to a second embodiment.

FIG. 13 is a flowchart of measurement performed by a propagation time measurement device 1 according to the second embodiment. Like numbers denote like processing steps in the flowchart in the first embodiment (FIG. 10).

The processing in steps S100 to S104 is the same as in the first embodiment. In step S130, the number of times the reception signal is obtained is counted. The processing in steps S102 to S104 is repeated until the count reaches N. Although N is set to, for example, 3 to 500 in the present embodiment, N may be any number. With this processing, N reception signals are accumulated in the RAM.

In step S131, the signal processor 111 uses the N reception signals to generate a reception signal with reduced noise. For example, the signal processor 111 may calculate the average of N reception signals or simply generate a signal by combining the N reception signals. In either case, the signal-to-noise ratio of the reception signal can be improved.

In step S132, the signal processor 111 calculates the cross-correlation function between the transmission signal and the noise-reduced reception signal. The processing is the same as in step S105 in the first embodiment except that the noise-reduced reception signal is used. In step S106, the signal processor 111 determines the propagation time from the first vibrator 101*a* to the second vibrator 101*b*.

Subsequently, the same processing is performed by switching the transmitting vibrator to the receiving vibrator and the receiving vibrator to the transmitting vibrator. The processing in step S107 and subsequent steps is the same as the processing described above except that the transmitting vibrator and the receiving vibrator are switched, and will not be described.

In the present embodiment described above, N reception signals are used in cross-correlation analysis. This allows more accurate measurement than in the first embodiment. In the present embodiment, N reception signals are averaged or combined to reduce noise in the reception signal before calculation of the cross-correlation function. In some embodiments, this procedure may be replaced by calculation of the cross-correlation function of each N reception signal and then averaging or combining the resultant N cross-correlation functions to reduce noise in the cross-correlation function. However, cross-correlation functions cause a high computational load. Thus, the former procedure may be used to reduce the number of computations for the cross-correlation function. In the present embodiment, the reception signals alone are averaged. In some embodiments, the transmission signals may also be averaged. Such an averaged transmission signal contains less noise, thus further reducing the noise in the cross-correlation function.

Third Embodiment

A propagation time measurement device 1 according to a third embodiment of the present invention automatically sets the appropriate transmission signal waveform in accordance with the arrangement (relative positions) of the vibrator pair. The basic structure is the same as described in the above embodiments. Thus, the third embodiment will be described focusing on the difference from the above embodiments.

Figure 14:
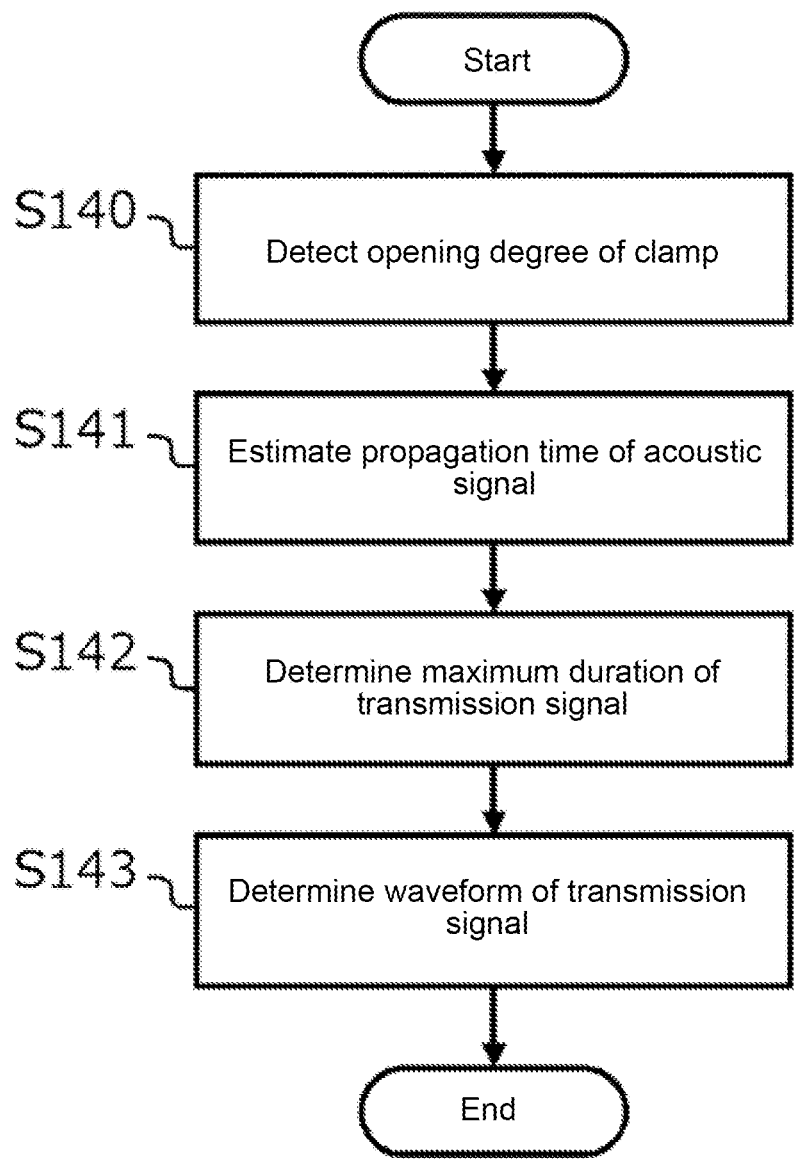
FIG. 14 is a flowchart of automatic setting of a transmission signal in a third embodiment.

FIG. 14 is a flowchart of automatic setting of a transmission signal in the third embodiment. For example, after the clamp 30 of the propagation time measurement device 1 is attached to the pipe 120, a predetermined button may be pressed to activate the automatic setting function. This causes the control circuit 102 to start the process shown in FIG. 14.

In step S140, the control circuit 102 detects the opening degree of the clamp 30. The opening degree of the clamp 30 is the distance or angle between the arms of the clamp. The opening degree can be detected with a sensor such as a range sensor or potentiometer. In step S141, the control circuit 102 calculates the relative positions of the two vibrators 101a and 101b based on the opening degree of the clamp 30 and estimates the propagation time of the acoustic signal based on the propagation distance between the two vibrators 101a and 101b. Other parameters that affect the propagation time (e.g., the wall thickness and material of the pipe 120, or the flow velocity and the flow rate of the fluid 121) may be preset or may be provided by the user. In step S142, the control circuit 102 determines the maximum duration of the transmission signal based on the estimated propagation time. The maximum duration may be determined to be shorter than the estimated propagation time. In step S143, the control circuit 102 selects the waveform data for the optimum duration from multiple pieces of waveform data registered in the storage 112. For example, the control circuit 102 may select, as the waveform data for measurement, the waveform data with the longest duration from the waveform data pieces with the duration shorter than or equal to the maximum duration determined in step S142. This allows measurement using the transmission signal with the longest possible duration among transmission signals satisfying condition 4, thus improving measurement accuracy.

Although the distance between the two vibrators is determined from the opening degree of the clamp 30 in the present embodiment, the distance and propagation time may be determined by other methods. For example, after the clamp 30 is attached to the pipe 120, a test signal may be transmitted from one of the vibrators to measure the propagation time. In some embodiments, the user may set parameters such as a pipe size, a fluid type, and a flow velocity. The distance and propagation time may be estimated from the set parameters.

<Others>

The embodiments described above are mere examples of the present invention. The present invention is not limited to the embodiments described above, but may be modified variously within the scope of the technical ideas of the invention. For example, in the device according to each of the above embodiments, after measurement of the propagation time of the acoustic signal, the measured propagation time is used to calculate the flow velocity and the flow rate of the fluid. In some embodiments, the flow velocity and the flow rate are not calculated. The propagation time measurement device may simply measure the propagation time. In this case, the processing in steps S100 to S106 in the flowchart in FIG. 10 or FIG. 13 may simply be performed. The propagation angle θ may be 90 degrees when measuring the propagation time alone. In the above embodiments, the clamp-on device to clamp the pipe is used. In some embodiments, the device may be built in the pipe. The vibrators in the above embodiments may be three or more vibrators, including vibrator pairs for propagating acoustic signals downstream and vibrator pairs for propagating acoustic signals upstream.

Figure 15A:
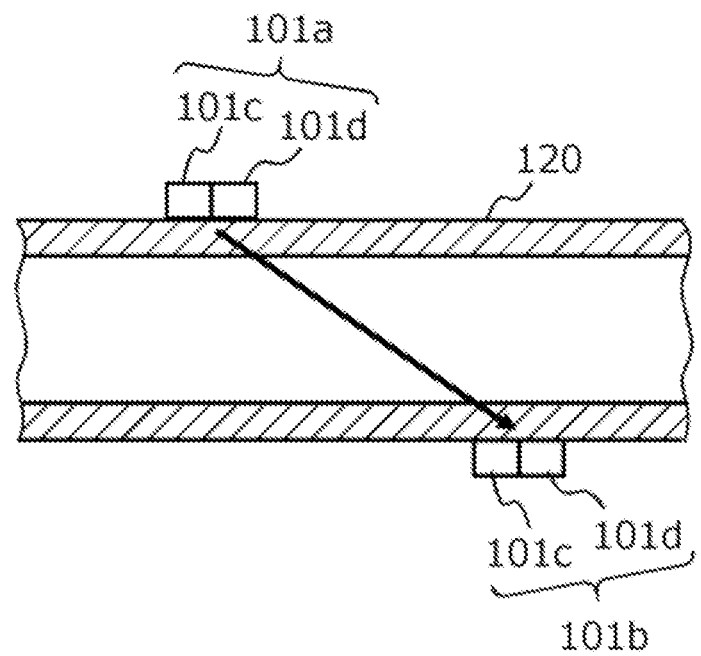
FIGS. 15A and 15B are diagrams of vibrators in modifications.
Figure 15B:
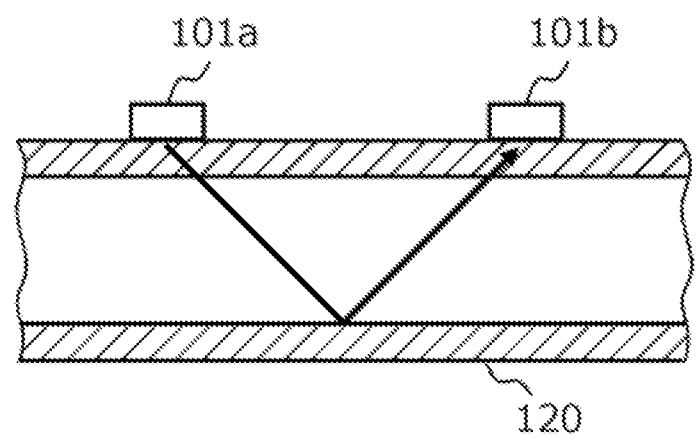

As shown in FIG. 15A, the first vibrator 101a may include vibrators 101c and 101d each with different frequency response. Similarly, the second vibrator 101b may include vibrators 101c and 101d each with different frequency response. For example, the vibrator 101c with a resonance frequency near 1 MHz and the vibrator 101d with a resonance frequency near 5 MHz may be arranged side by side. In this case, both of the frequency components can have higher conversion efficiency between electric signals and acoustic signals. Such vibrators may be effectively used with the transmission signal including combination of signals having different frequencies as in the example in FIG. 8A and with the frequency-modulated transmission signals as in the examples in FIGS. 4A and 5A. In the example in FIG. 15A, two vibrators 101c and 101d are combined, although three or more vibrators may be combined. The vibrators 101c and 101d may be aligned in the axial direction or radial direction of the pipe 120.

APPENDIX 1

1. A propagation time measurement device (1), comprising:
a plurality of vibrators (101a, 101b) at different positions relative to a pipe (120) in which a fluid (121) flows, the plurality of vibrators (101a, 101b) including at least a first vibrator (101a) configured to convert a transmission signal being an electric signal to an acoustic signal and a second vibrator (101b) configured to receive the acoustic signal transmitted from the first vibrator (101a) and propagating through the fluid (121) in the pipe (120) and convert the acoustic signal to a reception signal being an electric signal;
a transmission signal generator (110) configured to generate the transmission signal for measurement; and
a signal processor (111) configured to determine a propagation time of the acoustic signal from the first vibrator (101a) to the second vibrator (101b) through cross-correlation analysis between the transmission signal and the reception signal,
wherein the transmission signal generator (110) generates the transmission signal to satisfy
(1) a ratio of a height of a peak other than a maximum peak in an autocorrelation function of the transmission signal to a height of the maximum peak being 0.8 or less, and
(2) a duration of the transmission signal being at least five times a shortest period of the transmission signal or at least 20 times a half width at half maximum of the autocorrelation function of the transmission signal.

REFERENCE SIGNS LIST

1: propagation time measurement device
101: vibrator
101a: first vibrator
101b: second vibrator
102: control circuit
110: transmission signal generator
111: signal processor
120: pipe
121: fluid

The invention claimed is:
1. A propagation time measurement device, comprising:
a plurality of vibrators at different positions relative to a pipe in which a fluid flows, the plurality of vibrators including at least a first vibrator configured to convert a transmission signal being an electric signal to an acoustic signal and a second vibrator configured to receive the acoustic signal transmitted from the first vibrator and propagating through the fluid in the pipe and convert the acoustic signal to a reception signal being an electric signal;
a setting function configured to estimate a propagation time of the acoustic signal between the first vibrator and the second vibrator with the first and second vibrators positioned on the pipe and to set a maximum value of a duration of the transmission signal to be shorter than the estimated propagation time;

a transmission signal generator configured to generate the transmission signal for measurement; and a signal processor configured to determine a propagation time of the acoustic signal from the first vibrator to the second vibrator through cross-correlation analysis between the transmission signal and the reception signal, wherein the transmission signal generator generates the transmission signal to satisfy the conditions of:

a ratio of a height of a peak other than a maximum peak in an autocorrelation function of the transmission signal to a height of the maximum peak being 0.8 or less;

a duration of the transmission signal being at least five times a shortest period of the transmission signal or at least 20 times a half width at half maximum of the autocorrelation function of the transmission signal; and the duration of the transmission signal being shorter than or equal to the maximum value set by the setting function.

2. The propagation time measurement device according to claim 1, wherein the transmission signal generator generates the transmission signal to further satisfy the condition of:

the duration of the transmission signal being at least 10 times the shortest period of the transmission signal or at least 40 times the half width at half maximum of the autocorrelation function of the transmission signal.

3. The propagation time measurement device according to claim 1, wherein the transmission signal includes a frequency-modulated signal.

4. The propagation time measurement device according to claim 1, wherein the transmission signal includes a signal including a random pulse.

5. The propagation time measurement device according to claim 1, wherein the transmission signal includes a signal containing a plurality of signals having different frequencies combined together.

6. The propagation time measurement device according to claim 1, wherein the transmission signal includes a signal having a frequency changing at predetermined time segments.

7. The propagation time measurement device according to claim 1, wherein the signal processor uses a plurality of reception signals resulting from a plurality of transmissions from the first vibrator and a plurality of receptions by the second vibrator to perform cross-correlation analysis.

8. The propagation time measurement device according to claim 7, wherein the signal processor generates a noise-reduced reception signal using the plurality of reception signals and performs cross-correlation analysis between the transmission signal and the noise-reduced reception signal.

9. The propagation time measurement device according to claim 1, wherein the first vibrator and the second vibrator face each other across the pipe.

10. The propagation time measurement device according to claim 1, wherein the first vibrator and the second vibrator are at different positions in a longitudinal direction of the pipe.

11. The propagation time measurement device according to claim 1, further comprising:

a switch configured to cause the transmission signal to be input into the second vibrator and cause the reception signal to be output from the first vibrator receiving the acoustic signal transmitted from the second vibrator, wherein the signal processor determines the propagation time of the acoustic signal from the second vibrator to the first vibrator through cross-correlation analysis between the transmission signal input into the second vibrator and the reception signal output from the first vibrator.

12. The propagation time measurement device according to claim 11, wherein the signal processor determines at least one of a flow velocity or a flow rate of the fluid in the pipe based on a difference between the propagation time of the acoustic signal from the first vibrator to the second vibrator and the propagation time of the acoustic signal from the second vibrator to the first vibrator.

13. The propagation time measurement device according to claim 1, wherein each of the first vibrator and the second vibrator includes a combination of a plurality of vibrators each with a different frequency response.

14. The propagation time measurement device according to claim 1, wherein the setting function is configured to calculate a propagation distance between the first and second vibrators based on a relative position of the first and second vibrators and to estimate the propagation time of the acoustic signal based on the calculated propagation distance.

15. The propagation time measurement device according to claim 1, wherein the setting function is configured to estimate the propagation time of the acoustic signal between the first and second vibrators by transmitting a test signal from the first vibrator to the second vibrator.

16. The propagation time measurement device according to claim 1, wherein the setting function is configured to estimate the propagation time of the acoustic signal between the first and second vibrators based on parameters set by a user, the parameters including a size of the pipe, a type of the fluid, and a flow velocity of the fluid.

17. The propagation time measurement device according to claim 1, further comprising a storage that stores a plurality of types of waveform data, wherein the transmission signal generator selects, as waveform data for the transmission signal for measurement, waveform data satisfying the conditions from among the plurality of types of waveform data stored in the storage.

18. The propagation time measurement device according to claim 17, wherein the transmission signal generator selects, as the waveform data for the transmission signal for measurement, waveform data with the longest duration from among waveform data with the duration shorter than or equal to the maximum value set by the setting function.

* * * * *